United States Patent [19]

Gaide

[11] Patent Number: 5,150,856
[45] Date of Patent: Sep. 29, 1992

[54] SYSTEM FOR ALIGNING THE INERTIAL UNIT OF A CARRIED VEHICLE ON THAT OF A CARRIER VEHICLE

[75] Inventor: Pierre Gaide, Paris, France

[73] Assignee: Societe Anonyme dite: Aerospatiale Societe Nationale Industrielle, Paris, France

[21] Appl. No.: 783,903

[22] Filed: Oct. 29, 1991

[30] Foreign Application Priority Data

Oct. 29, 1990 [FR] France ................................ 90 13386

[51] Int. Cl.⁵ .............................................. F41G 7/36
[52] U.S. Cl. ..................................... 244/3.2; 244/3.1
[58] Field of Search ....................... 244/3.1, 3.15, 3.2, 244/3.21

[56] References Cited

U.S. PATENT DOCUMENTS

| | | | |
|---|---|---|---|
| 4,032,759 | 6/1977 | Danik | 244/3.2 |
| 4,444,086 | 4/1984 | White | 244/3.1 |
| 4,495,850 | 1/1985 | White | 244/3.1 |

FOREIGN PATENT DOCUMENTS

| | | |
|---|---|---|
| 0179197 | 4/1986 | Fed. Rep. of Germany . |
| 0184632 | 6/1986 | Fed. Rep. of Germany . |
| 0276663 | 8/1988 | Fed. Rep. of Germany . |

OTHER PUBLICATIONS

*IEEE Transactions on Aerospace and Electronic Systems*, vol. AES-16, No. 1, Jan., 1980, pp. 53–65; Bar-Itzhack et al., "Accurate Ins Transfer Alignment Using a Monitor Gyro and External Navigation Measurements".

Primary Examiner—Charles T. Jordan
Attorney, Agent, or Firm—Marshall, O'Toole, Gerstein, Murray & Bicknell

[57] ABSTRACT

The system may be used, for example, to initialize the inertial unit of a missile from the inertial unit of a vehicle carrying the missile. According to the invention, a servo-control circuit is provided for slaving data in the missile inertial unit on data from the carrier inertial unit, together with a Kalman filter connected in parallel with said servo-control circuit and designed to identify harmonization errors between the two inertial units.

7 Claims, 2 Drawing Sheets

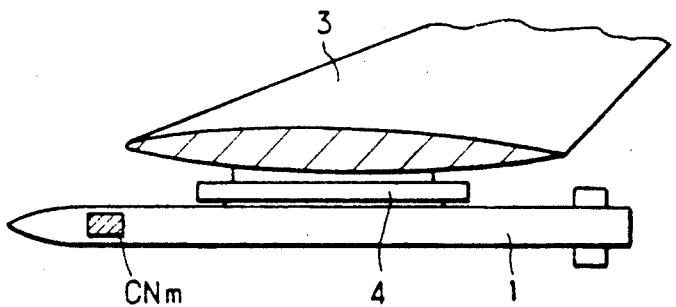
FIG.1a
FIG.1b
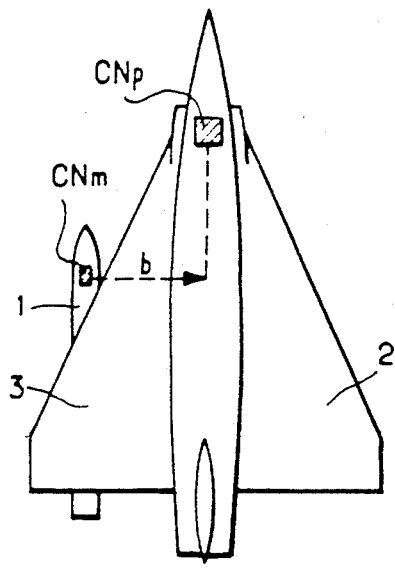
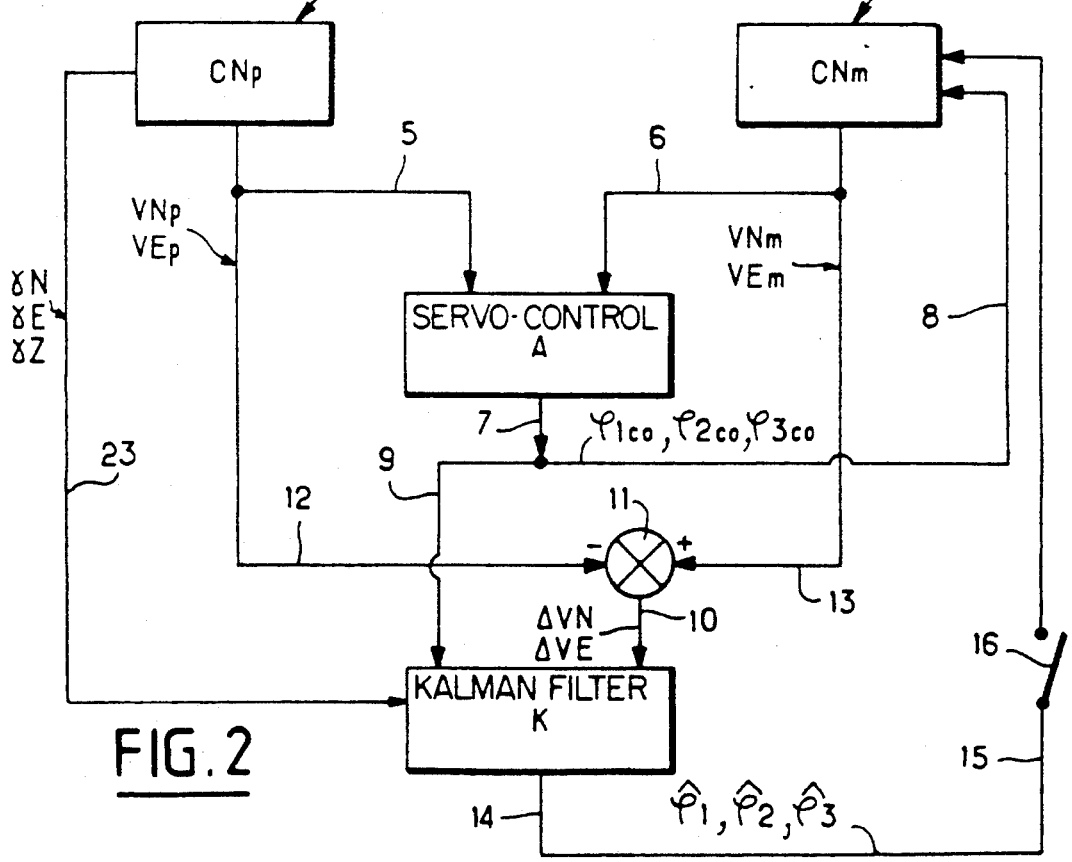
FIG.2

SYSTEM FOR ALIGNING THE INERTIAL UNIT OF A CARRIED VEHICLE ON THAT OF A CARRIER VEHICLE

The present invention relates to a system for aligning the inertial unit of a carried vehicle on that of a carrier vehicle.

BACKGROUND OF THE INVENTION

When an inertial unit is switched on, it is known that it is essential to initialize the unit so that the angle, velocity, and position data delivered at the time of initialization correspond exactly to the attitude, velocity, and position applicable to said inertial unit at the instant it is initialized. The data delivered by the said unit after it has been initialized is obtained by integrating gyro and accelerometer measurements starting from the initial data, such that any error in initialization gives rise to increasing errors subsequently.

When the carried vehicle (missile, aircraft, helicopter, torpedo, etc. ...) provided with an inertial unit is carried by a carrier vehicle (ship, aircraft, truck, submarine, etc. ...) that is likewise fitted with an operating inertial unit, it is common practice to initialize the inertial unit of said carried vehicle prior to said carrier vehicle leaving the carrier vehicle on the basis of data delivered by the inertial unit of the carrier vehicle. Such a procedure of initializing one inertial unit on the other is called "alignment".

It may be observed that during such initialization, there is generally no difficulty in aligning velocity and position since the relative position of the two inertial units is known exactly. In contrast, it is difficult to obtain angle alignment since the relative orientation of the two inertial units is not known exactly.

In what follows, it is only angular alignment of two inertial units that is taken into consideration, and not their alignment in velocity and position. In addition, for the purpose of simplifying explanation, it is assumed that each inertial unit is referenced in conventional manner on an intrinsic system of orthogonal reference axes ("an intrinsic reference axis system") comprising two horizontal axes, one of which (axis N) points north, another of which (axis E) points east, and the third of which is a vertical axis (axis Z), such that for said inertial unit attitudes are defined by three angles respectively called $\psi$ (i.e. psi=heading, relative to axis N), $\theta$ (i.e. theta=trim angle relative to the plane of the axes N and E) and $\phi$ (i.e. phi=roll angle), velocity is defined by three velocity components VN, VE, and VZ (relative to said axes N, E, and Z, respectively), and position is defined by three coordinates $\lambda$, G, and z which correspond respectively to latitude, to longitude, and to altitude. Naturally such a system of reference axes is given merely to facilitate explanation. The invention is not limited to this system and in the context of the present invention the system could be replaced by some other reference system.

It will be observed that the three angles $\psi$, $\theta$, and $\phi$ transform the intrinsic reference axis system to the physical axis system tied to the inertial unit under consideration.

Conversely, the angle measurements $\psi$, $\theta$, and $\phi$ in an inertial unit serve to define the calculation reference axis system of the unit.

On the basis of axes that are physically tied to the unit, the inverse rotations ($-\phi$ measured, then $-\theta$ measured, then $-\psi$ measured) transform to the calculation reference axis system which coincides with the intrinsic reference axis system if the measurements are perfect.

Thus, a set of rotations ($\phi 1$, $\phi 2$, $\phi 3$) is defined for transforming from the intrinsic reference system to the calculation reference axis system, with $\phi 1$, $\phi 2$, and $\phi 3$ corresponding respectively to rotations about the North axis, about the East axis, and about the vertical axis of the intrinsic reference axis system.

Further, the term "harmonization" angle errors (h1, h2, h3) is used for angle errors concerning knowledge of the orientation of the axes that are physically tied to the inertial unit of the carried vehicle, with h1, h2, and h3 corresponding to rotations about respective ones of said axes.

Ignoring the drift of the gyro systems, it may be observed that $\phi 1$, $\phi 2$, and $\phi 3$ are substantially constant in the North, East, and vertical axis system, and that h1, h2, and h3 which physically represent mechanical setting errors are substantially constant in a system of axes tied physically to the inertial unit of the carried vehicle.

By projecting the harmonization errors h1, h2, and h3 on the axes of the intrinsic reference system, errors h1V, h2V, h3C are defined which are thus not constant when the attitude of the carrier changes, with h1V and h2V corresponding to vertical harmonization errors and with h3C corresponding to a heading harmonization error.

Several methods are already known for angularly aligning one inertial unit on another.

In the following explanation, it may be assumed that the inertial units of the carrier vehicle and of the carried vehicle are parallel once their relative angular position is known, thereby simplifying the explanation.

The simplest method consists, at the time the inertial unit of the carried vehicle is initialized, in copying the angles $\psi$, $\theta$, and $\phi$ into it from the inertial unit of the carrier vehicle. Then, to avoid the influence of noise affecting the angles of the inertial unit of the carrier vehicle at the time of initialization, the copy is followed by servo-controlling the data $\psi$, $\theta$, and $\phi$ of the unit in the carried vehicle for a certain length of time and in a closed loop on the corresponding data of the unit in the carrier vehicle, thereby achieving filtering that eliminates the influence of said noise. However, this method assumes that the two inertial units are parallel (or that the relative orientation thereof is known). In the general case where the relative orientation of the two inertial units is not known accurately, copying angles under servo-control leaves said harmonization errors intact between the respective calculation reference axis systems of the two units, which errors are due to lack of parallelism between or to lack of knowledge about the relative angular positions of the two inertial units.

Another method is derived from that described in the work entitled NAVIGATION INERTIELLE OPTIMALE ET FILTRAGE STATISTIQUE (in translation: Optimum inertial navigation and statistical filtering) by FAURRE, CAMBERLEIN and CHEVREUIL, published by Dunod, 1971, Chapter 11. That work deals with aligning a fixed inertial unit.

However, by considering changes in accelerometer data between two moving inertial units, instead of considering data from the fixed inertial unit, the case of aligning a fixed unit can be generalized to aligning a moving unit on another unit subjected to the same motion. In that method, after similar initialization of $\psi$, $\theta$, and φ, the vertical is aligned by closed loop servo-control on the basis of velocity or acceleration errors relative to the N axes and to the E axes of the two calculation reference systems, and by servo-controlling the heading. In this method, advantage is taken of the fact that for a rectilinear trajectory at constant speed, the measured acceleration errors $\Delta\gamma N$ and $\Delta\gamma E$ relative to the N and E axes of the calculation reference system in each of the two inertial units are of the following types:

$$\Delta\gamma N = -g\phi 2 \quad (1)$$

$$\Delta\gamma E = g\phi 1 \quad (2)$$

where g is the acceleration due to gravity and $\phi 1$ and $\phi 2$ are respective angle offsets defined above. Thus, starting from measurements of $\Delta\gamma N$ and $\Delta\gamma E$, it is possible to calculate rotation commands $\phi 1co$ and $\phi 2co$ about the North and East axes respectively of the calculation reference system of the inertial unit in the carried vehicle, and to apply these commands to the inertial unit of the carried vehicle via a second order servo-control loop, i.e. a loop including integration. Thus, after the rotations about the axes N and E, the vertical axes Z of the calculation reference systems of the two units move into alignment after the servo-control has converged, at the end of which time the commands being passed $\phi 1co$ and $\phi 2co$ are respectively equal to $\Delta\gamma Eo/g$ and $-\Delta\gamma No/g$ where $\Delta\gamma Eo$ and $\Delta\gamma No$ are the (noise-free) mean acceleration errors prior to switching on the servo-control. It then suffices to servo-control (in the manner described above for the angles $\psi$, $\theta$, and $\phi$) simultaneously the heading $\psi$ of the carried vehicle inertial unit on the heading of the carrier vehicle inertial unit to achieve overall alignment. This method suffers from the drawback of requiring the trajectory of the carrier vehicle at the time of initialization to be rectilinear and at constant speed, and it leaves a systematic error constituted by the heading harmonization error.

Kalman filters have already been used to align one inertial unit on another. Such a method is described, for example, in the following works:

KALMAN FILTER FORMULATIONS FOR TRANSFER ALIGNMENT OF STRAPDOWN INERTIAL UNITS, by Alan M. SCHNEIDER, NAVIGATION, Journal of the Institute of Navigation, Vol. 30, No. 1, Spring 1983, pages 72 to 89;

THE ENIGMA OF FALSE BIAS DETECTION IN A STRAPDOWN SYSTEM DURING TRANSFER ALIGNMENT, by I. Y. BAR-ITZHACK and Y. VITEK, Journal of Guidance, Vol. 8, No. 2, March-April 1985, pages 175 to 180;

RAPID TRANSFER ALIGNMENT FOR TACTICAL WEAPON APPLICATIONS by James E. KAIN and James R. CLOUTIER, proceedings of the conference of the American Institute of Aeronautics and Astronautics, 370, l'Enfant Promenade, S.W. Washington, D.C. 20024, "Guidance Navigation and Control Conference," Boston, Aug. 14-16, 1989.

This method of alignment by Kalman filtering is based on the fact that if $\phi 1$, $\phi 2$, and $\phi 3$ are as defined above, the following may be written:

$$\Delta\gamma N = \gamma E.\phi 3 - \gamma Z.\phi 2 \quad (3)$$

$$\Delta\gamma E = -\gamma N.\phi 3 + \gamma Z.\phi 1 \quad (4)$$

in which $\gamma N$, $\gamma E$, and $\gamma Z$ are respectively the accelerations along the North, East, and vertical axes of the inertial unit of the carrier vehicle, and $\Delta\gamma N$ and $\Delta\gamma E$ are the acceleration differences measured by the two units along their own calculation reference North and East axes.

It may be observed that if the carrier vehicle moves at constant velocity, $\gamma N = \gamma E = 0$ and $\gamma Z = g$. Under such circumstances, equations 3 and 4 reduce respectively to above equations 1 and 2.

Thus, in the context of a Kalman filter state $X^T = [\Delta VN, \Delta VE, \phi 1, \phi 2, \phi 3]$ driven by the velocity measurement $[\Delta VN, \Delta VE]$ or the acceleration measurements $\Delta\gamma N$, $\Delta\gamma E$, use is made of equations 3 and 4, and the state model is:

$$\Delta \dot{V}N = \gamma E.\phi 3 - \gamma Z.\phi 2$$

$$\Delta \dot{V}E = -\gamma N.\phi 3 - \gamma Z.\phi 1$$

$$\dot{\phi} 1 = 0$$

$$\dot{\phi} 2 = 0$$

$$\dot{\phi} 3 = 0 \quad (I)$$

The filter may further include, without changing its operating principles:

a measurement of the vertical velocity difference $\Delta VZ$ and of the vertical acceleration difference $\Delta\gamma Z$; and the addition of the following rate of change equation in its model $$\Delta \dot{V}Z = -\gamma E.\phi 1 + \gamma N.\phi 2$$

A more complex state model could include modelling the errors in the instrumentation of the carried unit (gyro drift, accelerometer bias, etc. . . .). The carried unit is first initialized ($\psi$, $\theta$, $\phi$) on the basis of the corresponding data of the carrier unit, and then the Kalman filter is put into operation.

It may be observed in the context of this method of alignment by means of Kalman filtering that:

if the carrier vehicle is travelling at constant velocity, then equations (3) and (4) reduce to equations (1) and (2), so the method provides no means of estimating the heading error $\phi 3$. The theoretical heading error is then the sum of the heading harmonization error h3C and the heading initialization error;

if the carrier vehicle is moving so that the rate of change of $\gamma E$ and $\gamma Z$, and also of $\gamma N$ and $\gamma Z$ are not proportional, they can be distinguished from each other and the system is said to be "observable". The Kalman filter can then estimate the three errors $\phi 1$, $\phi 2$, and $\phi 3$, and is thus capable of performing alignment without significant theoretical error; and if the trajectory of the carrier vehicle gives rise to little contrast between the rates of change of $\gamma E$ and $\gamma Z$, and of $\gamma N$ and $\gamma Z$, then the system has low observeability, and the estimates of $\phi 1$, $\phi 2$, and $\phi 3$ are poor, particularly with respect to the heading error $\phi 3$ which includes the influence of the heading harmonization error and the influence of the heading initialization error. The method of alignment by Kalman filtering is then not usable.

An object of the present invention is to remedy the drawbacks of the three known methods recalled above, and it provides a system making it possible simultaneously:

to avoid imposing a precise trajectory on the carrier vehicle;

to estimate the errors $\phi 1$, $\phi 2$, and $\phi 3$ providing the trajectory of the carrier vehicle makes the system observable;

if the observeability of the system by the trajectory of the carrier vehicle is low or zero, to leave only the heading harmonization error as a main error; and depending on circumstances, to identify the harmonization errors between the two inertial units:

for the vertical and for heading if the trajectory of the carrier vehicle makes the system observable; or for the vertical only if constant velocity and a rectilinear trajectory prevent the heading error being observable.

SUMMARY OF THE INVENTION

To this end, the present invention provides a first moving vehicle provided with a first inertial navigation unit in operation and referenced on a first intrinsic reference axis system tied to a system of terrestrial axes;

a second vehicle provided with a second inertial navigation unit that is to be put into operation, said unit being referenced to a second intrinsic reference axis system similar to said first intrinsic reference axis system, said second vehicle being carried by said first vehicle and being stationary on average relative to said first vehicle;

a closed loop servo-control circuit enabling said second inertial navigation unit to be provided at the instant it is put into operation with angle data delivered by said first inertial navigation unit relative to said first system of reference axes, said servo-control circuit then delivering rotation commands that are applied to said second inertial navigation unit for the purpose of refining its angular initialization;

subtracter means receiving velocity or acceleration data from said first and second inertial navigation units each of which units delivers said data parallel to two non-vertical axes in the corresponding ones of said first and second calculation reference axis systems, said subtracter means delivering velocity or acceleration difference data parallel to the two corresponding non-vertical axes of said first calculation reference axis system; and a Kalman filter simultaneously receiving said rotation commands from said servo-control circuit and said velocity or acceleration difference data, and calculating estimates of the angle offsets of the axes of said second calculation reference system as corrected by the preceding servo-control relative to the corresponding axes of said first calculation reference axis system, said Kalman filter applying said estimates to said second inertial navigation unit after the servo-control performed by said servo-control circuit has finished and after the Kalman filter has itself converged.

Naturally, the said subtracter means may be incorporated in the Kalman filter, such that it directly receives said velocity or acceleration data delivered by said first and second inertial navigation units.

It can be seen that in the system of the present invention, the Kalman filter is, so to speak, connected in parallel with the servo-control circuit and operates at the same time, thereby making it possible to identify the residual errors left by said servo-control circuit, and mainly constituted by the harmonization errors that are not identified by the servo-control circuit. It will be observed that the closed loop servo-control performed by said servo-control circuit is thus associated with an open loop method (Kalman filter).

In a first embodiment of the invention, said servo-control circuit is of the first type described above and it slaves the angle data delivered by said second inertial navigation unit on the angle data delivered by said first inertial navigation unit. In this case, if the trajectory of the carrier vehicle makes the system observable, then by using the Kalman filter, the system of the invention is capable of separately identifying the harmonization errors between said first and second inertial navigation units. If the trajectory does not make the system observable, only heading servo-control is required to automatically reduce the heading error to the heading harmonization error. It is then no longer essential to servo-control $\theta$ and $\phi$, but such servo-control makes it possible to reduce the residual angle values to be identified and separately to identify the vertical harmonization errors at the outlet from the Kalman filter.

In a second embodiment, in which each of said first and second calculation reference axis systems includes a vertical axis, servo-control circuit is of the second type described above and it slaves firstly the position of the calculation vertical axis of said second reference axis system on the position of the calculation vertical axis of said first reference axis system, and secondly the heading data delivered by said second inertial navigation unit on the heading data delivered by said first inertial navigation unit. Thus, if the trajectory of the carrier vehicle makes the system observable, the system of the invention then makes it possible to identify, separately, the heading harmonization error.

Preferably, regardless of the type of servo-control circuit, the system of the invention includes a supervisor associated with said Kalman filter to improve its estimation performance.

In addition, it is advantageous for the system of the present invention to include first calculation means between said first inertial navigation unit and said subtracter means, the calculation means serving to correct velocity or acceleration errors due to the lever arm between said first and second inertial navigation units.

As mentioned above, since the system of the invention makes it possible to identify harmonization errors (vertical and heading, or heading only, depending on the type of servo-control circuit), providing the trajectory of the carrier vehicle makes these errors observable, it is advantageous to provide second calculation means receiving the error estimates from the Kalman filter, optionally via its supervisor, and performing co-ordinate changes on these estimates to transform from said first reference axis system to a third axis system tied to said first vehicle, and relative to which the harmonization errors are defined. Thus, when said second vehicle is one of a plurality of interchangeable vehicles that may be mounted in succession at a fixed position on said first vehicle, the data delivered by said second calculation means relating to a second vehicle (which data concerns the portion of the harmonization errors due to said first vehicle) can be used to correct said portion of the harmonization error for another second vehicle subsequently mounted on said first vehicle, e.g. by changing the mechanical settings between said first and second vehicles, or by performing angle calculation compensation in the inertial unit of the carried vehicle.

The system of the present invention is applicable to any type of inertial unit used for said first and/or second inertial navigation unit; such units may be of the stabilized type or of the strapdown type. In addition, the system can be used regardless of the type of carrier vehicle and regardless of the type of carried vehicle.

BRIEF DESCRIPTION OF THE DRAWINGS

An embodiment of the invention is described by way of example with reference to the accompanying drawings, in which:

FIGS. 1a and 1b show an application of the system of the invention, with FIG. 1a being a plan view of a fighter aircraft carrying a missile beneath one of its wings, and with FIG. 1b being a side view showing said missile carried beneath said wing, which wing is shown in part only.

FIG. 2 is a simplified block diagram of the system of the present invention.

DETAILED DESCRIPTION

Figure 3:
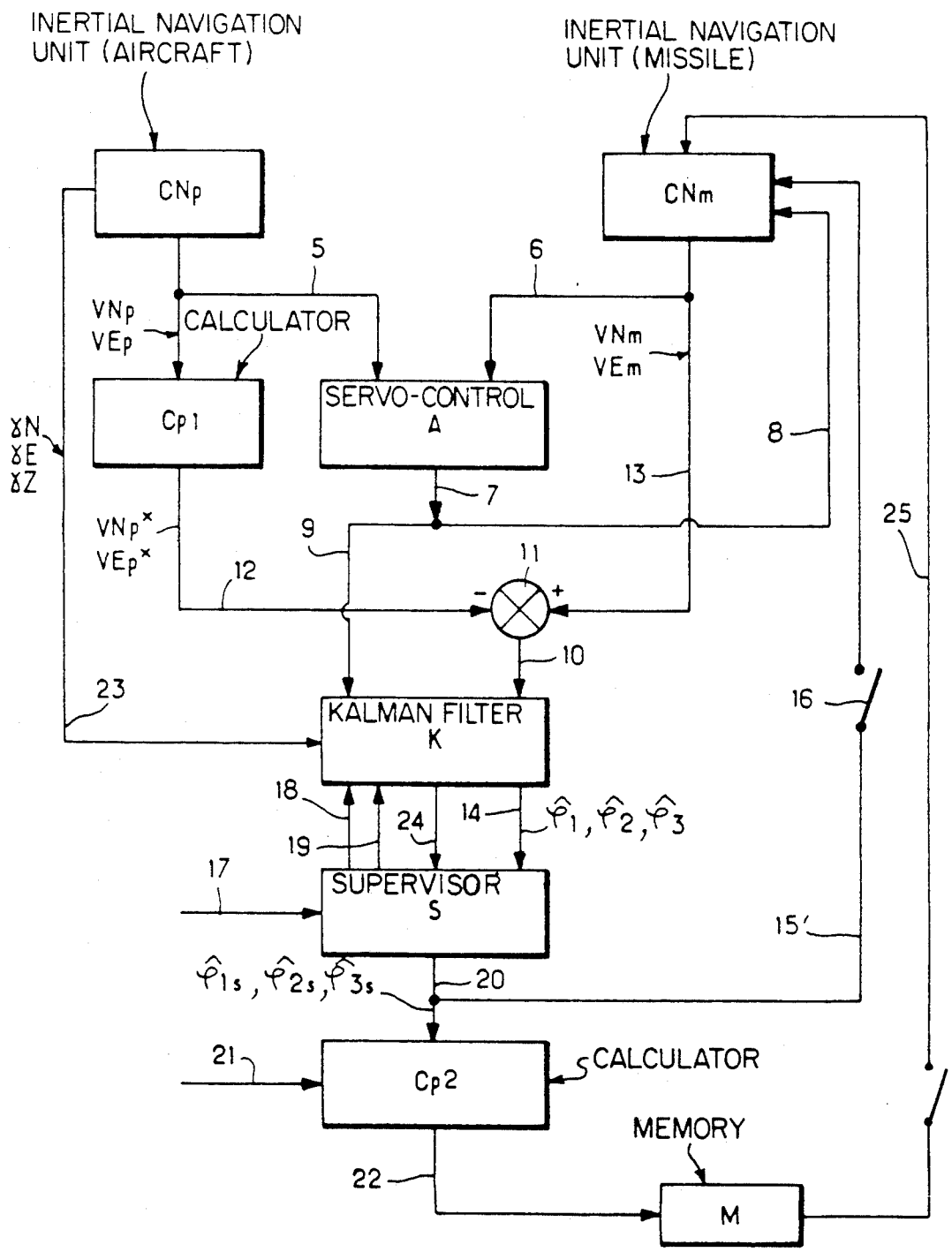
FIG. 3 is a block diagram of one embodiment of the system of the present invention.

FIGS. 1a and 1b are diagrams showing an application of the present invention to aligning the inertial navigation unit CNm of a missile 1 on the inertial navigation unit CNp of a carrier aircraft 2.

The carried missile 1 is fastened beneath a wing 3 of a carrier aircraft 2 by means of a missile launcher 4, the missile 1 being substantially parallel to the axis of the aircraft.

The block diagram of FIG. 2 shows the system of the invention for aligning the inertial unit CNm of the missile 1 on the inertial unit CNp of the aircraft 2, prior to firing the missile.

The system shown in FIG. 2 includes a servo-control circuit A of one or other of the two known types recalled above. This servo-control circuit A has links 5 and 6 via which it receives the output signals from the two units CNp and CNm. Regardless of whether it is of the angle servo-control type or of the vertical and heading servo-control type, its output 7 delivers three angle servo-control commands $\dot{\phi}1co$, $\dot{\phi}2co$, and $\dot{\phi}3co$, and these commands are applied via a link 8 to the unit CNm in the missile 1 to cause it to correct its measurements by rotating the three axis of its calculation reference system.

In addition, the system of FIG. 2 includes a Kalman filter K that receives the angle servo-control commands $\dot{\phi}1co$, $\dot{\phi}2co$, and $\dot{\phi}3co$ from the output 7 of the servo-control circuit A via a link 9. The Kalman filter also receives the output signal from a subtracter 11 via a link 10. The subtracter has a link 12 over which it receives the velocity signals VNp and VEp (or the corresponding acceleration signals) generated by the carrier inertial unit CNp, and via a link 13 it receives the velocity signals VNm and VEm (or the acceleration signals) generated by the carried inertial unit CNm, with these four velocity (or acceleration) signals representing the velocity (or acceleration) components of said units respectively relative to their North axes and to their East axes. Thus, the output signal from the subtracter 11 comprises velocity differences $\Delta VN$ and $\Delta VE$ (or acceleration differences) between the two units CNp and CNm relative to the North axis and the East axis in the axis system of the unit CNp. The Kalman filter also receives the accelerations $\gamma N$, $\gamma E$, and $\gamma Z$ along the North, East, and vertical axes respectively either from the carrier unit CNp as represented in FIG. 2 by link 23, or else from the carried unit CNm. The servo-control circuit A and the Kalman filter K are preferably both put into operation at the same time.

After servo-control by the circuit A, the commands $\dot{\phi}1co$, $\dot{\phi}2co$, and $\dot{\phi}3co$ still contain residual initialization errors concerning the calculation reference axes by the unit in the carried vehicle, and these errors are substantially equal to the harmonization errors (for heading only in the case of vertical servo-control).

Simultaneously, since the model of the Kalman filter K is of the type:

$$\dot{X} = AX + BU$$

with $U = (\dot{\phi}1co, \dot{\phi}2co, \dot{\phi}3co)$ and since the filter is provided with the measurements $\Delta VN$ and $\Delta VE$, it is possible, ignoring angle drift, to write the following:

$$\Delta \dot{V}N = \gamma E.\phi3 - \gamma Z.\phi2$$

$$\Delta \dot{V}E = -\gamma N.\phi3 - \gamma Z.\phi1$$

$$\dot{\phi}1 = \dot{\phi}1co$$

$$\dot{\phi}2 = \dot{\phi}2co$$

$$\dot{\phi}3 = \dot{\phi}3co \qquad (II)$$

At its output 14, the Kalman filter thus delivers estimates $\hat{\phi}1$, $\hat{\phi}2$, and $\hat{\phi}3$ of the harmonization errors projected onto the reference axes N, E, and Z of the carrier vehicle unit, axes physically referenced to the unit CNm relative to those referenced to the unit CNp.

At the end of the servo-control by the circuit A and after its own convergence, the Kalman filter K transmits the estimates $\hat{\phi}1$, $\hat{\phi}2$, and $\hat{\phi}3$ to the unit CNm of the missile 1 via a link 15 which includes a normally open switch 16. This transmission is performed by closing the switch 16.

Thus, on receiving the commands $\hat{\phi}1$, $\hat{\phi}2$, and $\hat{\phi}3$ generated by the Kalman filter K, the unit CNm rotates the axes in its calculation reference system to correspond, thereby terminating alignment thereof on the axes of the reference system of the unit CNp.

In the embodiment shown in FIG. 3, there can be seen the units CNp and CNm, the servo-control circuit A, the subtracter 11, the filter K, and the switch 16, together with the links 5, 6, 8, 9, and 10 and the outputs 7 and 14. However, the system shown in FIG. 3 further includes calculation means Cp1 interposed in the link 12, a supervisor S associated with the Kalman filter K, calculation means Cp2, and a memory M.

The purpose of the calculation means Cp1 is to take account of the lever arm b between the two inertial navigation units CNp and CNm and to modify the velocities VNp and VEp (or the accelerations) to shift the home point of the unit CNp to coincide with that of the unit CNm. Such a correction is simple and commonplace and is not described in detail. Thus, the velocity data $VNp^x$ and $VEp^x$ actually applied by the link 12 to the subtracter 11 is corrected for the effect of the lever arm b.

At the output 14 from the Kalman filter K, the supervisor S receives the commands $\hat{\phi}1$, $\hat{\phi}2$, and $\hat{\phi}3$, and on an input 17 it receives data concerning the trajectory of the aircraft 2, which data comes from its flight computer (not shown). The purpose of the supervisor S is to improve the estimation performance of the Kalman filter K and to do this:

it performs adaptive adjustments of the covariances of the state noise and of the measurement noise as a function of the observeability of the system given the trajectory of the aircraft 2 and as a function of the nature of the measurement noise. It applies these adjustments to the Kalman filter K via links 18 and 19. Such adaptive adjustments may be implemented, for example, in a manner similar to that described in the communication SUPERVISION D'UN FILTRE DE KALMAN PAR SYSTEME EXPERT EN TEMPS REEL—APPLICATION A LA NAVIGATION D'UN SATELLITE (in translation: Real time supervision of a Kalman filter by an expert system—application to satellite navigation) by D. BERTON, T. CODRON, R. HORAK, and S. SALLE, of SAGEN Centre d'Etude d'Eragny, B. P. 51, 95612 Cergy-Pontoise Cedex, National Colloquium March 1989, SMAI, automatic systems for aeronautics and space;

it validates the heading estimate $\hat{\phi}3$ if the error covariance in the heading as calculated by the Kalman filter K and delivered by a link 24 comes under a threshold that is adjustable as a function of the desired accuracy. The system of the present invention makes it possible to align the unit CNm on the unit CNp even when the trajectory of the aircraft 2 (or of some other carrier vehicle such as a ship) is not favorable to identifying errors quickly, but without special maneuvers being required. The pilot of the aircraft 2 must then be continuously informed about the accuracy achieved for heading, given the trajectory of the aircraft 2. It is thus important for the estimated error $\hat{\phi}3$ to be validated on the basis of an estimate of the identification error achieved on this estimated error; and in conventional manner, it filters the estimates $\hat{\phi}1$, $\hat{\phi}2$, and $\hat{\phi}3$ to deliver filtered identified values $\hat{\phi}1s$, $\hat{\phi}2s$, and $\hat{\phi}3s$ at its output 20. When the servo-control circuit A has finished its action and when the convergence of the Kalman filter has been validated, these filtered and identified values are transmitted via a link 15' having the switch 16 interposed thereon to the inertial unit CNm of the missile 1, thereby enabling it to perform a correcting rotation of its own reference axis system.

The calculation means Cp2 receive said filtered and identified values $\hat{\phi}1s$, $\hat{\phi}2s$, and $\hat{\phi}3s$ from the output 20 of the supervisor S, which values are in the calculation reference axis system of the unit CNp, and it projects them by rotations $\psi$, $\theta$, and $\phi$ on axes referenced to the unit CNm in order to obtain the harmonization errors. To do this, these means receive various data concerning the trajectory of said aircraft 2 from its flight computer via an input 21. Thus, the calculation means Cp2 deliver at output 22 that portion of the harmonization errors in the axis system of the unit CNm that is due to the unit CNp. This data is stored in the memory M.

Subsequently, after the missile 1 has been fired, it is replaced by an identical missile which is fixed in identical manner beneath the wing 3 by means of the same missile launcher 4, and it is then possible when aligning the inertial unit of the new missile to take account immediately of said portion of the harmonization errors (either by a physical setting or else by software via a controlled link 25), thereby reducing the values of the corrections that need to be applied by the servo-control system A, and by the Kalman filter K, optionally associated with its supervisor S.

I claim:

1. A system comprising:
   a first moving vehicle provided with a first inertial navigation unit in operation and referenced on a first intrinsic reference axis system tied to a system of terrestrial axes;
   a second vehicle provided with a second inertial navigation unit that is to be put into operation, said unit being referenced to a second intrinsic reference axis system similar to said first intrinsic reference axis system, said second vehicle being carried by said first vehicle and being stationary on average relative to said first vehicle;
   a closed loop servo-control circuit enabling said second inertial navigation unit to be provided at the instant it is put into operation with angle data delivered by said first inertial navigation unit relative to said first system of reference axes, said servo-control circuit then delivering rotation commands that are applied to said second inertial navigation unit for the purpose of refining its angular initialization;
   subtracter means receiving velocity or acceleration data from said first and second inertial navigation units each of which units delivers said data parallel to two non-vertical axes in the corresponding ones of said first and second calculation reference axis systems, said subtracter means delivering velocity or acceleration difference data parallel to the two corresponding non-vertical axes of said first calculation reference axis system; and
   a Kalman filter simultaneously receiving said rotation commands from said servo-control circuit and said velocity or acceleration difference data, and calculating estimates of the angle offsets of the axes of said second calculation reference system as corrected by the preceding servo-control relative to the corresponding axes of said first calculation reference axis system, said Kalman filter applying said estimates to said second inertial navigation unit after the servo-control performed by said servo-control circuit has finished and after the Kalman filter has itself converged.

2. A system according to claim 1, wherein said servo-control circuit slaves the angle data delivered by said second inertial navigation unit on the angle data delivered by said first inertial navigation unit.

3. A system according to claim 1, in which each of said first and second calculation reference axis systems includes a vertical axis, wherein said servo-control circuit slaves firstly the position of the vertical axis of said second calculation reference axis system on the position of the vertical axis of said first calculation reference axis system, and secondly the heading data delivered by said second inertial navigation unit on the heading data delivered by said first inertial navigation unit.

4. A system according to claim 1, including a supervisor associated with said Kalman filter.

5. A system according to claim 1, including calculation means between said first inertial navigation unit and said subtracter means, said calculation means serving to correct the velocity or acceleration error due to the lever arm between said first and second inertial navigation units.

6. A system according to claim 1, including second calculation means receiving the error estimates from the Kalman filter and changing the coordinates thereof to transform them from said first reference axis system to a third axis system tied to said first vehicle.

7. A system according to claim 6, including a memory for storing said error estimates after the change of coordinates.

* * * * *